(12) United States Patent
Lihan et al.

(10) Patent No.: US 12,347,452 B2
(45) Date of Patent: Jul. 1, 2025

(54) METHOD AND SYSTEM FOR GENERATING MULTIMEDIA CONTENT

(71) Applicant: LY Corporation, Tokyo (JP)

(72) Inventors: Marc Adrian Chua Lihan, Tokyo (JP); Mao-Yuan Kao, Tokyo (JP); Jing-Ya Huang, Tokyo (JP); Cheng-Ho Chen, Tokyo (JP); Kai-Ju Chang, Tokyo (JP)

(73) Assignee: LY Corporation, Tokyo (JP)

( * ) Notice: Subject to any disclaimer, the term of this patent is extended or adjusted under 35 U.S.C. 154(b) by 304 days.

(21) Appl. No.: 17/542,823

(22) Filed: Dec. 6, 2021

(65) Prior Publication Data

US 2022/0180893 A1 Jun. 9, 2022

(30) Foreign Application Priority Data

Dec. 8, 2020 (KR) .................. 10-2020-0170569

(51) Int. Cl.
*G10L 25/63* (2013.01)
*G06F 3/16* (2006.01)
*G10L 15/00* (2013.01)
*H04L 51/04* (2022.01)
*H04L 51/10* (2022.01)

(52) U.S. Cl.
CPC .............. *G10L 25/63* (2013.01); *G06F 3/16* (2013.01); *G10L 15/00* (2013.01); *H04L 51/04* (2013.01); *H04L 51/10* (2013.01)

(58) Field of Classification Search
USPC .................................................. 704/1–504
See application file for complete search history.

(56) References Cited

U.S. PATENT DOCUMENTS

| | | | |
|---|---|---|---|
| 7,165,033 B1 * | 1/2007 | Liberman | G10L 17/26 704/206 |
| 10,592,103 B2 * | 3/2020 | Choi | H04M 1/72427 |
| 11,769,489 B2 * | 9/2023 | Lee | G10L 15/22 704/251 |
| 11,776,533 B2 * | 10/2023 | Mont-Reynaud | G06F 40/205 704/5 |
| 2003/0163320 A1 * | 8/2003 | Yamazaki | G10L 13/10 704/E13.004 |
| 2015/0287403 A1 | 10/2015 | Holzer Zaslansky et al. | |
| 2017/0171280 A1 * | 6/2017 | Kim | H04L 65/1083 |
| 2017/0330578 A1 * | 11/2017 | Karimi-Cherkandi | H04M 1/2475 |
| 2018/0143761 A1 * | 5/2018 | Choi | G06F 3/0482 |
| 2018/0285641 A1 * | 10/2018 | Yan | G06V 20/20 |
| 2019/0260866 A1 * | 8/2019 | Choi | H04M 1/72469 |
| 2022/0180893 A1 * | 6/2022 | Lihan | G06F 3/167 |
| 2023/0381638 A1 * | 11/2023 | Kumar | G06F 3/013 |

OTHER PUBLICATIONS

Communication issued Oct. 17, 2024 in Taiwanese Application No. 110145002.

* cited by examiner

*Primary Examiner* — Marcus T Riley
(74) *Attorney, Agent, or Firm* — Sughrue Mion, PLLC

(57) ABSTRACT

A method for generating multimedia content is provided. The method includes receiving voice data that includes a recording of a voice of a user, receiving a selection of one character from among a plurality of characters from the user, and transmitting a multimedia content generated based on the voice data, a state of the user identified based on the voice data, and the selected character to another user.

16 Claims, 10 Drawing Sheets

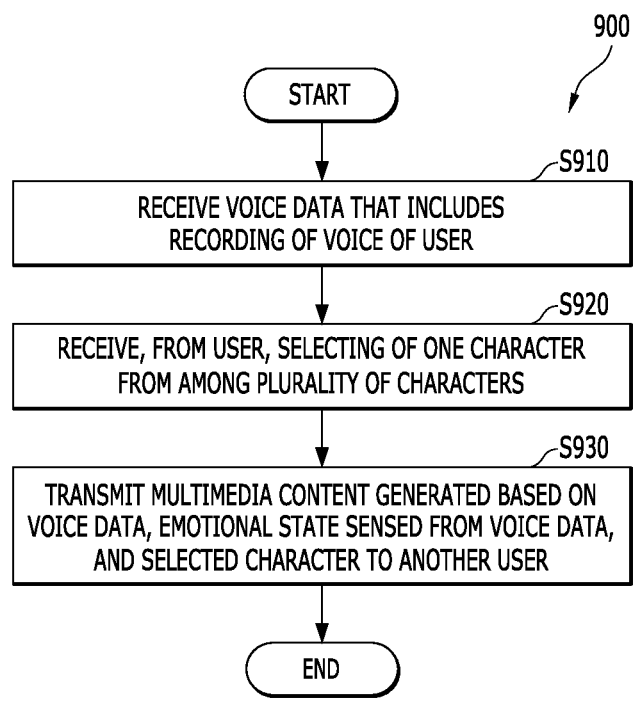

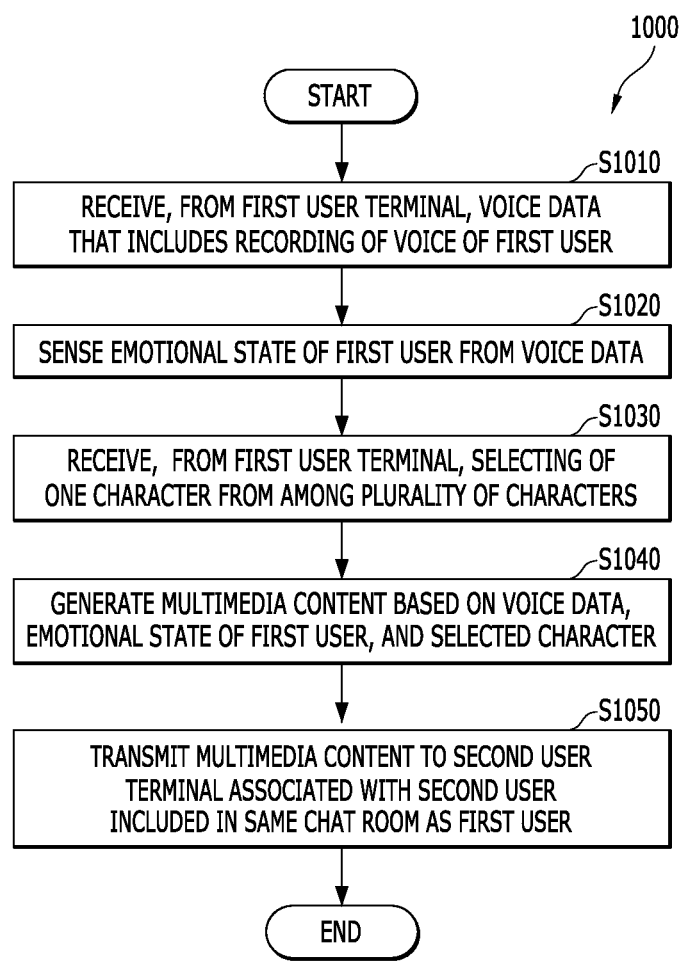

METHOD AND SYSTEM FOR GENERATING MULTIMEDIA CONTENT

CROSS-REFERENCE TO RELATED APPLICATION

This application claims priority to Korean Patent Application No. 10-2020-0170569, filed in the Korean Intellectual Property Office on Dec. 8, 2020, the disclosure of which is incorporated by reference herein in its entirety.

TECHNICAL FIELD

Field

Apparatuses, systems, and methods according to example embodiments relate to generating multimedia content, and more particularly, to a method and a system for generating multimedia content representative of a state of the user on an instant messaging application.

Description of Related Art

With the proliferation of mobile devices such as smartphones or the like and the development of the Internet, instant messaging services using mobile devices are widely used. Users of instant messaging services can naturally communicate and chat with each other in everyday life. However, for languages with many types of characters (e.g., Chinese), there is a problem in that it is difficult to input a desired message as text.

The instant messaging services may provide a voice message service capable of transmitting a voice of the user through a chat room. Accordingly, without having to input text, users can simply exchange a conversation with a counterpart by using the voice message service. However, there is a problem in that such a voice message service simply transmits the recorded voice of the user, but cannot provide a visual effect.

SUMMARY

One or more example embodiments provide a method for, a non-transitory computer-readable recording medium storing instructions for, and a system (device) for generating an multimedia content for solving the above problems.

One or more example embodiments may be implemented in a variety of ways, including a method, a system (device), or a non-transitory computer-readable recording medium storing instructions.

According to an aspect of an example embodiment, a method for generating multimedia content includes: receiving voice data that includes a recording of a voice of a user; receiving a selection of one character from among a plurality of characters from the user; and transmitting a multimedia content generated based on the voice data, a state of the user identified based on the voice data, and the selected character to another user.

The transmitting may include transmitting the multimedia content to the another user through a chat room on an instant messaging application.

The selected character may be associated with a plurality of animated graphic objects, each of which expresses a different emotional state, and the multimedia content may include the voice data and the plurality of animated graphic objects.

The method may further include identifying an action of the selected character based on the state of the user.

The voice data may include first data corresponding to a first time section in which a signal strength is less than a predetermined threshold and second data corresponding to a second time section in which the signal strength is equal to or greater than the predetermined threshold, the multimedia content may include the voice data and an animated graphic object expressing the state of the user, and the method may further include generating the multimedia content such that the animated graphic object is maintained in a stationary state during the first time section, and is replayed during the second time section.

The voice data may include first data corresponding to a first time section associated with a first emotional state and second data corresponding to a second time section associated with a second emotional state, the selected character may be associated with a first animated graphic object expressing the first emotional state and a second animated graphic object expressing the second emotional state, and the method may further include generating the multimedia content such that the multimedia content replays the first animated graphic object and the first data together during the first time section, and replays the second animated graphic object and the second data together during the second time section.

The method may further include identifying the state of the user based on an audio frequency characteristic of the voice data.

The method may further include: performing a voice recognition process based on the voice data to obtain a character string; and identifying the state of the user based on the character string.

The method may further include displaying the plurality of characters on a display, wherein each of the plurality of characters includes an animated graphic object expressing the state of the user.

The plurality of characters may be arranged and displayed based on a usage history.

The plurality of characters may be recommendations for characters frequently used by other users in relation to the state of the user.

According to an aspect of an example embodiment, a non-transitory computer-readable recording medium stores instructions for execution by one or more processors that, when executed by the one or more processors, cause the one or more processors to perform a method for generating multimedia content, the method including: receiving voice data that includes a recording of a voice of a user; receiving a selection of one character from among a plurality of characters from the user; and transmitting a multimedia content generated based on the voice data, a state of the user identified based on the voice data, and the selected character to another user.

According to an aspect of an example embodiment, an information processing system includes: a communication interface; at least one memory; and at least one processor connected to the at least one memory and configured to execute at least one program stored in the at least one memory, wherein the at least one program includes instructions for controlling the information processing system to: receive voice data that includes a recording of a voice of a first user from a first user terminal; identify a state of the first user based on the received voice data; receive, from the first user terminal, a selection of one character from among a plurality of characters; and generate a multimedia content based on the voice data, the state of the first user, and the selected character.

The at least one program may further include instructions for controlling the information processing system to transmit the multimedia content to a second user terminal associated with a second user included in a chat room on the same instant messaging application as the first user.

The selected character may be associated with a plurality of animated graphic objects, each of which expresses a different emotional state, and the multimedia content may include an animated graphic object associated with the voice data and the state of the first user.

The at least one program may further include instructions for controlling the information processing system to identify an action of the selected character included in the multimedia content based on the state of the first user.

The voice data may include first data corresponding to a first time section in which a signal strength is less than a predetermined threshold and second data corresponding to a second time section in which the signal strength is equal to or greater than the predetermined threshold, the multimedia content may include an animated graphic object associated with the voice data and the state of the first user, and the at least one program may further include instructions for controlling the information processing system to generate the multimedia content such that the animated graphic object is maintained in a stationary state during the first time section, and is replayed during the second time section.

The voice data may include first data corresponding to a first time section associated with a first emotional state and second data corresponding to a second time section associated with a second emotional state, the selected character may be associated with a first animated graphic object expressing the first emotional state and a second animated graphic object expressing the second emotional state, and the at least one program may further include instructions for controlling the information processing system to generate the multimedia content such that the multimedia content replays the first animated graphic object and the first data together during the first time section, and replays the second animated graphic object and the second data together during the second time section.

The at least one program may further include instructions for controlling the information processing system to analyze an audio frequency characteristic of the voice data and identify the state of the first user based on the audio frequency characteristic, without considering language and content.

The at least one program may further include instructions for controlling the information processing system to perform a voice recognition process based on the voice data to obtain a character string; and identify the state of the first user based on the character string.

According to one or more example embodiments, an emotion/mood state may be expressed by combining voice data and a character expressing an emotional state.

According to one or more example embodiments, multimedia content can be generated such that a character appears to move according to the user's actual voice, thereby intuitively expressing a state of the user to other users.

According to one or more example embodiments, multimedia content that reflects multiple emotional states may be generated and transmitted to another user.

The effects of the present disclosure are not limited to the effects described above, and other effects not described can be clearly understood by those of ordinary skill in the art (referred to as "ordinary technician") from the description of the claims.

BRIEF DESCRIPTION OF THE DRAWINGS

The above and/or other aspects will be more apparent by describing certain example embodiments, with reference to the accompanying drawings, in which:

FIG. 9 is a flowchart illustrating a method for transmitting a multimedia content according to an example embodiment; and FIG. 10 is a flowchart illustrating a method for generating a multimedia content according to an example embodiment.

DETAILED DESCRIPTION

Figure 1:
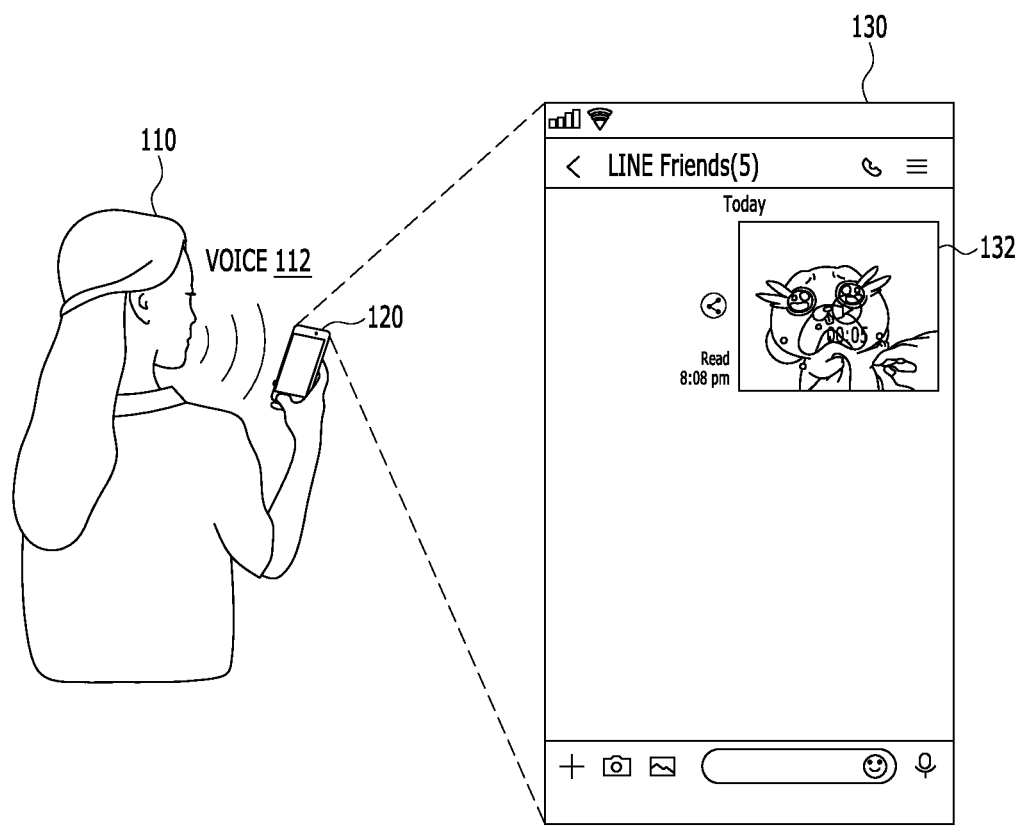
FIG. 1 is a diagram illustrating an example in which an emotion-based multimedia content is provided through an instant messaging application operating in a user terminal according to an example embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. In addition, in the following description of example embodiments, duplicate descriptions of the same or corresponding components may be omitted. However, even if descriptions of components are omitted, it is not intended that such components are not included in any example embodiment.

Advantages and features of the disclosed example embodiments and methods of accomplishing the same will be apparent by referring to example embodiments described below in connection with the accompanying drawings. However, the present disclosure is not limited to the example embodiments disclosed below, and may be implemented in various different forms, and the present example embodiments are merely provided to make the present disclosure complete, and to fully disclose the scope of the invention to those skilled in the art to which the present disclosure pertains.

The terms used herein will be briefly described prior to describing the disclosed example embodiments in detail. The terms used herein have been selected as general terms which are widely used at present in consideration of the functions of the present disclosure, and this may be altered according to the intent of an operator skilled in the art, conventional practice, or introduction of new technology. In addition, in a specific case, the term may be arbitrarily selected by the applicant, and the meaning of the term will be described in detail in a corresponding description of the example embodiments. Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, this indicates that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an example embodiment, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), etc. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EE-PROM), flash memory, magnetic or optical data storage, registers, etc. The memory is said to be in electronic communication with a processor if the processor can read information from and/or write information to the memory. The memory integrated with the processor is in electronic communication with the processor.

In the present disclosure, a "chat room" may refer to a virtual space or group in which one or more users (or user accounts) may participate, which may be generated in an instant messaging application and the like installed on a computing device. For example, one or more user accounts may participate or be included in the chat room and exchange various types of messages, files, and the like. In addition, in the chat room, a Voice over Internet Protocol (VoIP) voice call function, a VoIP video call function, a live broadcast function (VoIP real-time video transmission function), and a multimedia content generation function are provided, enabling voice calls, video calls, video streaming, multimedia content transmission, and the like to be performed between user accounts.

In the present disclosure, a "user" may refer to a user of an instant messaging application or a user account of the instant messaging application. In this example, the user account may represent an account generated and used by the user in the instant messaging application or data related thereto.

FIG. 1 is a diagram illustrating an example in which an emotion-based multimedia content 132 is provided through an instant messaging application operating in a user terminal 120 according to an example embodiment. A user 110 may use the user terminal 120 to exchange messages with another user subscribed to the instant messaging application. In an example embodiment, the user 110 may exchange text messages, voice messages, video messages, multimedia content 132, and the like with another user through the instant messaging application.

The user 110 may transmit a message or data to another user through a chat room interface 130. In an example embodiment, the user 110 may transmit voice data including a recording of a voice 112 of the user to another user through the chat room interface 130. For example, the user 110 may select a record button provided on the instant messaging application with a touch input or the like, to record the voice 112 of the user and transmit the recorded voice data to another user. In this case, the user 110 may combine a character (or a sticker, an emoji, and the like) with the recorded voice data and transmit a result to another user.

The user 110 may transmit the multimedia content 132 generated by combining the voice 112 and the character of the user to another user through the chat room interface 130. In this example, the character is used to visually convey the emotion or feeling of the user 110, and may include an emoticon, an emoji, a sticker, an image, a video, and the like. For example, in order to generate the multimedia content 132, the user 110 may select a character provided on the application by default or obtain a new character from a store or the like and use the same. In this case, a character dedicated for generating the multimedia content 132 may be provided, but example embodiments are not limited thereto, and the existing ones such as emoticon or the like may be used to generate the multimedia content 132.

The user 110 may transmit the emotion-based multimedia content 132 expressing his or her emotion to another user. In this case, in order to generate the emotion-based multimedia content 132, the emotional state of the user 110 may be identified based on the voice data that includes a recording of the voice 112 of the user. For example, the emotional state of the user 110 may be identified based on an audio frequency characteristic of the voice data. In another example, the emotional state of the user 110 may be identified based on a character string detected from the voice data. In this case, the multimedia content 132 may be generated by combining the voice data with the character making a motion that may represent the identified emotional state of the user 110, and transmitted to another user.

While FIG. 1 illustrates that the user 110 records the voice 112 of the user in real time using the user terminal 120, example embodiments are not limited thereto. For example, the voice data previously stored in the user terminal 120 may be used to generate the multimedia content 132, or the voice data received from another computing device may be used to generate the multimedia content 132. With this configuration, the user 110 can effectively express his or her current emotion/mood state by transmitting the multimedia content 132 combining the voice data and the character expressing his or her emotional state rather than simply transmitting a voice message to another user.

Figure 2:
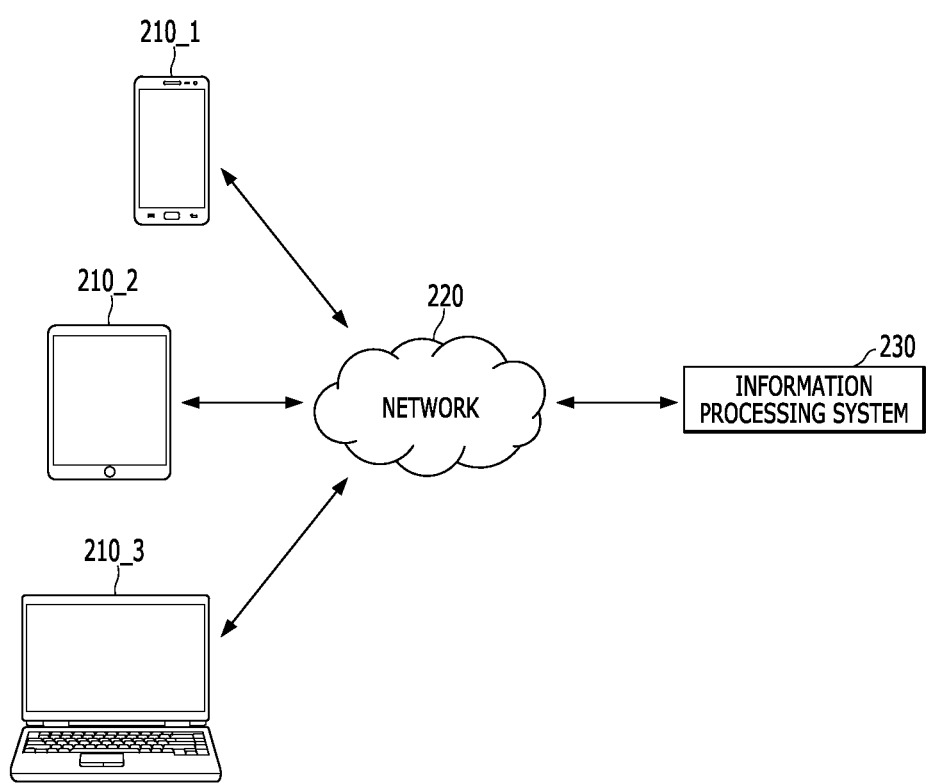
FIG. 2 is a schematic diagram illustrating a configuration in which an information processing system is communicatively connected to a plurality of user terminals in order to provide an emotion-based multimedia content generation service according to an example embodiment.

FIG. 2 is a schematic diagram illustrating a configuration in which an information processing system 230 is communicatively connected to a plurality of user terminals 210_1, 210_2, and 210_3 to provide a service for providing an emotion-based multimedia content generation service according to an example embodiment. The information processing system 230 may include a system(s) capable of providing an instant messaging service including an emotion-based multimedia content generation service through a network 220. In an example embodiment, the information processing system 230 may include one or more server devices and/or databases, or one or more distributed computing devices and/or distributed databases based on a cloud computing service, which are capable of storing, providing and executing computer-executable programs (e.g., downloadable applications) and data relating to the instant messaging service and the emotion-based multimedia content generation. For example, the information processing system 230 may include separate systems (e.g., servers) for providing the emotion-based multimedia content generation service and/or the instant messaging service.

The instant messaging service provided by the information processing system 230 may be provided to the user through the instant messaging application or the like installed in each of the plurality of user terminals 210_1, 210_2, and 210_3. For example, the instant messaging service may include a text messaging service, a voice messaging service, a video call service, a voice call service, a video streaming service, an emotion-based multimedia content generation and providing service, and the like between users of the instant messaging application.

The plurality of user terminals 210_1, 210_2, and 210_3 may communicate with the information processing system 230 through the network 220. The network 220 may be configured to enable communication between the plurality of user terminals 210_1, 210_2, and 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication is not limited, and may include a communication method using a communication network (e.g., mobile communication network, wired Internet, wireless Internet, broadcasting network, satellite network, etc.) that may be included in the network 220 as well as short-range wireless communication between the user terminals 210_1, 210_2 and 210_3.

In FIG. 2, a mobile phone terminal 210_1, a tablet terminal 210_2, and a PC terminal 210_3 are illustrated as examples of the user terminals, but example embodiments are not limited thereto, and the user terminals 210_1, 210_2 and 210_3 may be any computing device that is capable of wired and/or wireless communication and that can be installed with the instant messaging application and execute the same. For example, the user terminal may include a smart phone, a mobile phone, a navigation system, a computer, a notebook computer, a digital broadcasting terminal, Personal Digital Assistants (PDA), a Portable Multimedia Player (PMP), a tablet PC, a game console, a wearable device, an internet of things (IoT) device, a virtual reality (VR) device, an augmented reality (AR) device, and the like. In addition, FIG. 2 illustrates that three user terminals 210_1, 210_2, and 210_3 are in communication with the information processing system 230 through the network 220, but example embodiments are not limited thereto, and a different number of user terminals may be configured to be in communication with the information processing system 230 through the network 220.

In an example embodiment, the information processing system 230 may receive from the user terminals 210_1, 210_2, and 210_3 the voice data that includes the recording of the voice of the user. In addition, the information processing system 230 may receive, from the user terminals 210_1, 210_2, and 210_3, a selection of one character from among a plurality of characters. In this case, the information processing system 230 may receive the voice data and the selection of the character through the instant messaging application or the like installed in the user terminals 210_1, 210_2, and 210_3. Then the information processing system 230 may identify the emotional state of the user based on the received voice data, generate a multimedia content based on the voice data, the emotional state of the user, and the selected character, and provide the generated multimedia content to other users.

Figure 3:
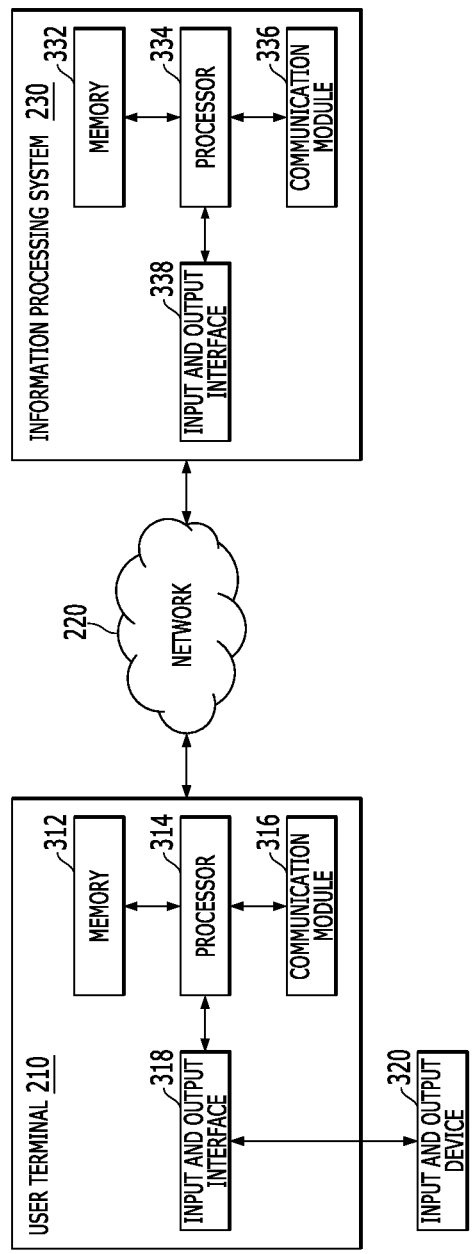
FIG. 3 is a block diagram illustrating an internal configuration of the user terminal and the information processing system according to an example embodiment.

FIG. 3 is a block diagram illustrating an internal configuration of the user terminal 210 and the information processing system 230 according to an example embodiment. The user terminal 210 may refer to any computing device that is capable of executing the instant messaging application and also capable of wired/wireless communication, and may include the mobile phone terminal 210_1, the tablet terminal 210_2, and the PC terminal 210_3 of FIG. 2, for example. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data through the network 220 using the respective communication modules 316 and 336. In addition, an input and output device 320 may be configured to input information and/or data to the user terminal 210 or to output information and/or data generated from the user terminal 210 through the input and output interface 318.

The memories 312 and 332 may include any non-transitory computer-readable recording medium. According to an example embodiment, the memories 312 and 332 may include a permanent mass storage device such as random access memory (RAM), read only memory (ROM), disk drive, solid state drive (SSD), flash memory, etc. As another example, a non-destructive mass storage device such as ROM, SSD, flash memory, disk drive, etc., may be included in the user terminal 210 or the information processing system 230 as a separate permanent storage device that is distinct from the memory. In addition, an operating system and one or more program codes (e.g., a code for the instant messaging application, and the like installed and driven in the user terminal 210) may be stored in the memories 312, 332.

These operating system and one or more program codes (i.e., software components) may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, etc., for example. As another example, the software components may be loaded into the memories 312 and 332 through the communication modules 316 and 336 rather than the computer-readable recording medium. For example, one or more programs may be loaded into the memories 312 and 332 based on a computer program (e.g., an application that provides the instant messaging service or the emotion-based multimedia content generation and providing service) that is installed by the files provided by the developers or a file distribution system for distributing an installation file of the application through the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to program code stored in a recording device such as the memories 312 and 332.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., voice data that includes the recording of the voice of the user, the selection of one character from among a plurality of characters, and the like) generated by the processor 314 of the user terminal 210 according to the program code stored in the recording device such as the memory 312 or the like may be transmitted to the information processing system 230 through the network 220 under the control of the communication module 316. Conversely, a control signal or a command provided under the control of the processor 334 of the information processing system 230 may be received by the user terminal 210 through the communication module 316 of the user terminal 210 via the communication module 336 and the network 220. For example, the user terminal 210 may receive a multimedia content generated based on the emotional state of the user and the selected character from the information processing system 230.

The input and output interface 318 may be a device for interfacing with the input and output device 320. As an example, the input device may include a device such as a camera, a keyboard, a microphone, a mouse, etc., which includes an audio sensor and/or an image sensor, and the output device may include a device such as a display, a speaker, a haptic feedback device, etc. As another example, the input and output interface 318 may be a device for interfacing with a device, such as, for example, a touch screen or the like that integrates a configuration or function for performing inputting and outputting.

While FIG. 3 illustrates that the input and output device 320 is not included in the user terminal 210, example embodiments are not limited thereto, and the input and output device 320 may be integrally configured within the user terminal 210. In addition, the input and output interface 338 of the information processing system 230 may be used for interfacing with a device for inputting or outputting, which may be connected to the information processing system 230 or included in the information processing system 230. In FIG. 3, while the input and output interfaces 318 and 338 are illustrated as the components configured separately from the processors 314 and 334, example embodiments are not limited thereto, and the input and output interfaces 318 and 338 may be configured to be included in the processors 314 and 334.

The user terminal 210 and the information processing system 230 may include more components than the components illustrated in FIG. 3. According to an example embodiment, the user terminal 210 may be implemented to include at least a part of the input and output devices 320 described above. In addition, the user terminal 210 may further include other components such as a transceiver, a Global Positioning System (GPS) module, a camera, various sensors, a database, and the like. For example, when the user terminal 210 is a smartphone, it may generally include components included in the smartphone, and for example, it may be implemented such that various components such as an acceleration sensor, a gyro sensor, a microphone module, a camera module, various physical buttons, buttons using a touch panel, input and output ports, a vibrator for vibration, etc., are further included in the user terminal 210.

According to an example embodiment, the processor 314 of the user terminal 210 may be configured to operate an instant messaging application or a web browser application which provides the instant messaging service including the emotion-based multimedia content generation service. In this case, the program code associated with the corresponding application may be loaded into the memory 312 of the user terminal 210. While the application is running, the processor 314 of the user terminal 210 may receive information and/or data provided from the input and output device 320 through the input and output interface 318 or receive the information and/or data from the information processing system 230 through the communication module 316, and process the received information and/or data and store it in the memory 312. In addition, such information and/or data may be provided to the information processing system 230 through the communication module 316.

While the instant messaging application is running, the processor 314 may receive voice data, text, image, video, and the like input or selected through the input device such as a camera, a microphone, and the like that includes a touch screen, a keyboard, an audio sensor and/or an image sensor connected to the input and output interface 318, and store the received voice data, text, image, and/or video or the like in the memory 312, or provide it to the information processing system 230 through the communication module 316 and the network 220. In an example embodiment, the processor 314 may receive, through an input device, the voice data that includes the recording of the voice of the user and the user's selection of one character from among a plurality of characters to provide the corresponding data and request to the information processing system 230 via the network 220 and the communication module 316.

The processor 334 of the information processing system 230 may be configured to manage, process, and/or store the information and/or data received from a plurality of user terminals and/or a plurality of external systems. In an example embodiment, the processor 334 may store, process, and transmit the voice data, information on the selected character, and the like received from the user terminal 210. For example, the processor 334 may identify the emotional state of the user based on the received voice data, and generate a multimedia content based on the voice data, the emotional state of the user, and the selected character. The multimedia content generated as described above may be provided to another user through the instant messaging application or the like.

Figure 4:
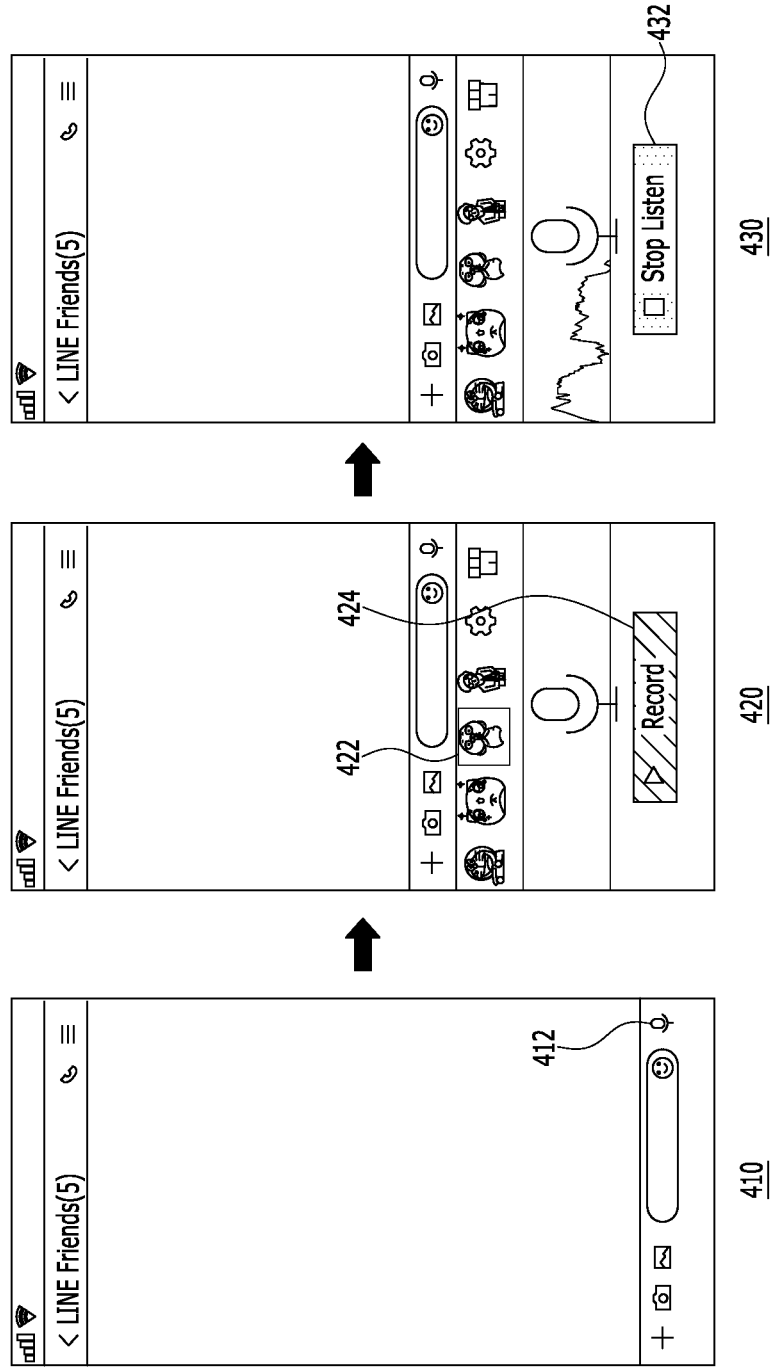
FIG. 4 is a diagram illustrating an example in which a multimedia content is generated according to an example embodiment.

FIG. 4 is a diagram illustrating an example in which the multimedia content is generated by the user terminal 210 according to an example embodiment. The user terminal 210 may transmit the emotion-based multimedia content to another user terminal through a chat room on the instant messaging application. In an example embodiment, the user terminal 210 may transmit the emotion-based multimedia content expressing emotions through a first operation 410, a second operation 420, and a third operation 430.

The first operation 410 shows that a recording icon 412 for recording a voice of the user is displayed on a display (e.g., on a chat room interface) of the user terminal 210. In an example embodiment, an interface for recording the voice of the user may be provided based on selection of the recording icon 412 displayed on the display with a touch input or the like. FIG. 4 illustrates that the recording icon 412 is representative of a microphone and is displayed on a right side of the message input window, but example embodiments are not limited thereto, and the recording icon 412 may be displayed as other icons at any location on the chat room interface.

The second operation 420 shows that a plurality of characters and a record button 424 are displayed on the display in response to the selection of the recording icon 412. In this case, each of the plurality of characters may be one of a set of stickers. In another example, each of the plurality of characters may be an image and may be associated with a particular subject. In an example embodiment, all characters owned by the user may be displayed on the display. Alternatively, among the characters owned by the user, the characters having animated graphic objects expressing the emotional states of the user identified based on the voice data of the user may be displayed on the display.

The user may select the record button 424 with a touch input or the like to record the voice of the user. In addition, the user may select one of a plurality of characters displayed on the display with a touch input or the like to determine a character for generating the multimedia content. For example, the user may select a "Bunny" character 422 displayed on the display with a touch input or the like, and determine the "Bunny" character 422 as a character for generating the multimedia content. In this case, the user may select a character first and then perform voice recording, or may select a character after completing the voice recording.

In an example embodiment, the plurality of characters displayed on the display may be arranged and displayed based on a usage history of the user in the past. For example, the plurality of characters may be arranged and displayed in the order of use by the user (i.e., characters that have been used recently are displayed ahead of characters that have not been used recently). In another example, the plurality of characters may be arranged and displayed in the order of higher frequency of use by the user in the past. In another example, the plurality of characters may be arranged and displayed by comprehensively considering the frequency of use in the past, the date and time of use by the user in the past, and so on. In another example, when voice recording is first performed before the user selects a character, the characters may be arranged and displayed in the order of recent use by the user in relation to the emotional state identified based on the voice recording.

In another example embodiment, the plurality of characters may be the recommendations for the characters that are frequently used by the other users in relation to the emotional state of the user. That is, among the characters owned by the user, characters frequently used by the other users of the instant messaging application may be displayed on the display. For example, a plurality of characters may be arranged and displayed based on the frequency of use in the past, the date and time of use in the past by other users, and the like. In another example, when the voice recording is first performed before the user selects a character, the characters may be arranged and displayed in the order of higher frequency of use by the other users in relation to the emotional state identified based on the voice recording.

The third operation 430 shows a process in which the voice of the user is recorded when the user selects the record button 424 with a touch input or the like. When the user performs the voice recording, audio frequency of voice, recording time, and the like may be displayed in real time. After all voice recording is performed, the user may select a recording completion button 432 displayed on the display with a touch input or the like to complete the voice recording. When the recording completion button 432 is selected by the user, the voice data that includes the recording of the voice of the user may be transmitted to a system (e.g., information processing system 230) for generating a emotion-based multimedia content. In this case, information on the character selected by the user may also be transmitted to the system.

While FIG. 4 illustrates that four characters are displayed on the display, example embodiments are not limited thereto, and any number of characters may be displayed on the display. In addition, although it is described above that an input for selecting a character and an input for selecting the record button 424 are distinguished from each other in FIG. 4, example embodiments are not limited thereto, and the voice recording may start automatically upon the user selection of one character. Conversely, when the user selects the record button 424 or the recording completion button 432, the character most preferred by the user or by the other users for the identified emotional state may be automatically selected.

Figure 5:
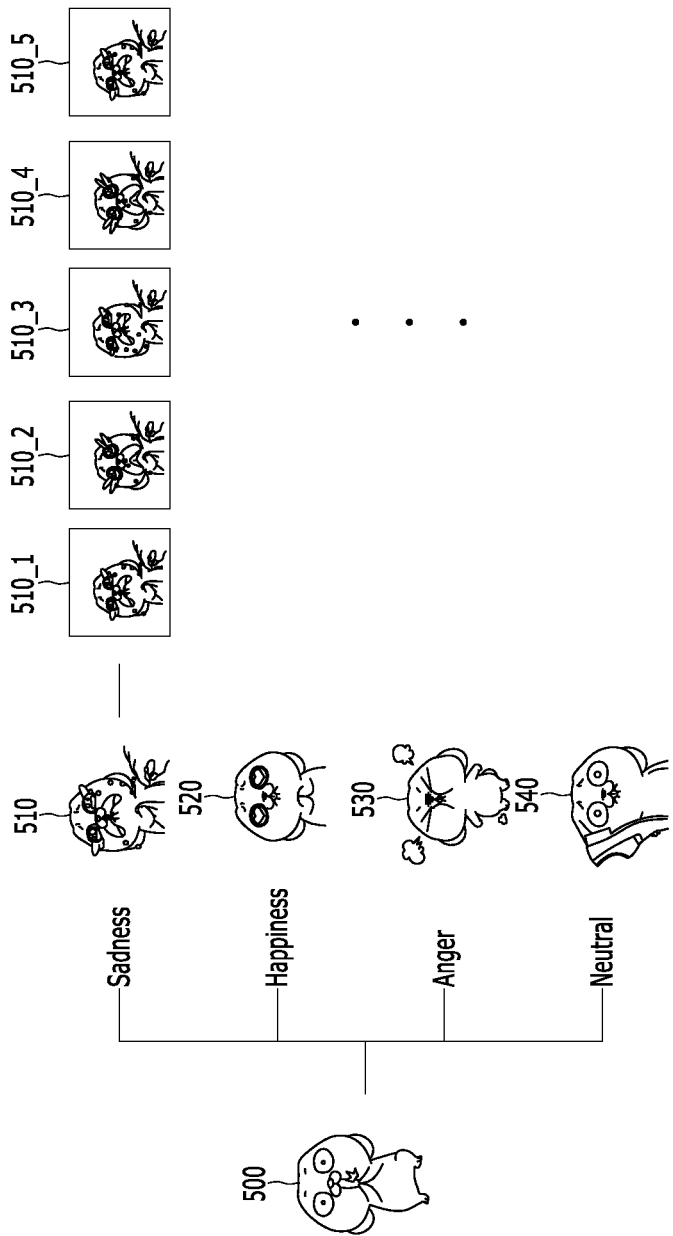
FIG. 5 is a diagram illustrating an animated graphic object associated with various emotional states corresponding to a character according to an example embodiment.

FIG. 5 is a diagram illustrating animated graphic objects 510, 520, 530, and 540 associated with various emotional states corresponding to a character 500 according to an example embodiment. The character 500 may be associated with the plurality of animated graphic objects 510, 520, 530, and 540 expressing different emotional states from each other. As illustrated, the character 500 may include a graphic object 510 expressing sadness, a graphic object 520 expressing happiness, a graphic object 530 expressing anger, a graphic object 540 expressing neutral, and the like. Additionally, the character 500 may further include a graphic object expressing fear, a graphic object expressing contempt, a graphic object expressing disgust, a graphic object expressing surprise, and the like.

The animated graphic objects 510, 520, 530, and 540 may each include a plurality of preset images or videos expressing the movement of the character 500. For example, the animated graphic object 510 expressing sadness may include five preset images 510_1, 510_2, 510_3, 510_4, and 510_5 in which the appearance (e.g., gaze direction, mouth shape, body movement, and the like) of the character 500 is slightly changed. In an example embodiment, when the multimedia content is generated by using the graphic object 510 expressing sadness, the corresponding multimedia content may be configured such that the preset images 510_1, 510_2, 510_3, 510_4, and 510_5 included in the graphic object 510 may be repeatedly replayed every predetermined time intervals (e.g., 0.1 seconds), or replayed according to a time interval determined according to a voice of the user.

While FIG. 5 illustrates that the graphic object 510 includes the five preset images 510_1, 510_2, 510_3, 510_4, and 510_5, example embodiments are not limited thereto, and each graphic object may include a different number of preset images. In addition, although it is described in FIG. 5 that the order of replaying the preset images is predetermined, example embodiments are not limited thereto, and the user's mouth shape may be first determined based on the voice data of the user, and then the preset images may be replayed to represent a mouth shape similar to the determined mouth shape.

Figure 6:
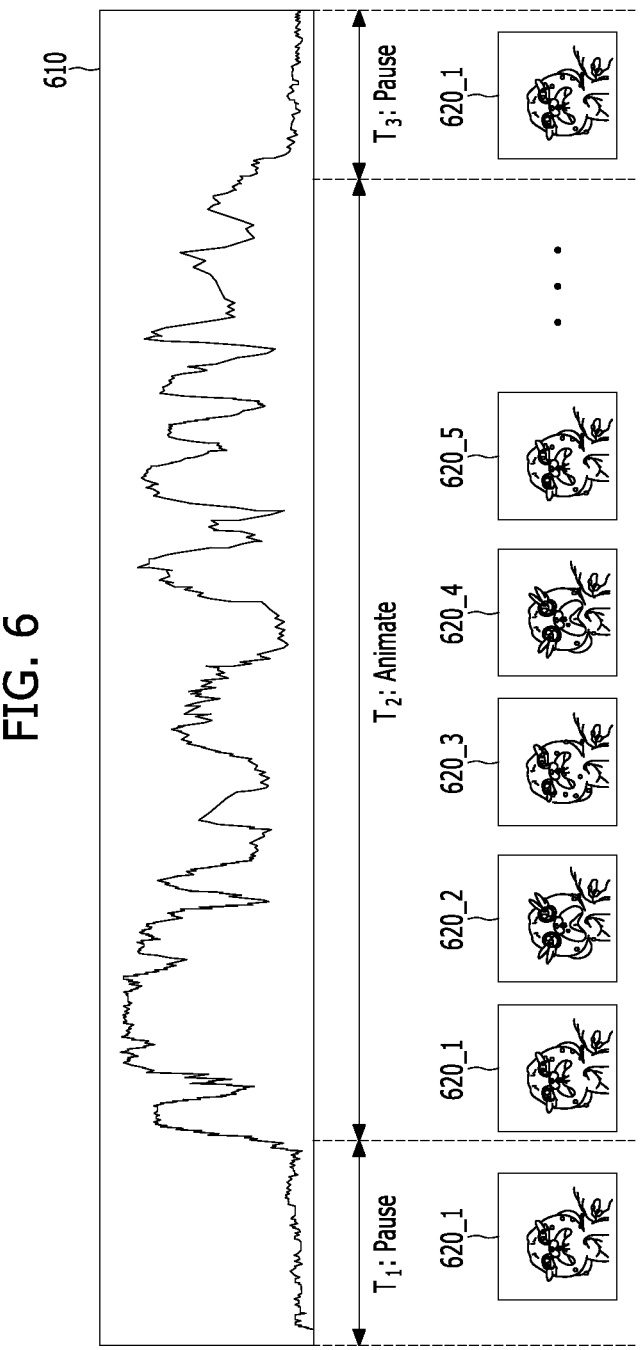
FIG. 6 is a diagram illustrating an action of a graphic object according to a section of voice data according to an example embodiment.

FIG. 6 is an exemplary diagram illustrating an action of the graphic object according to a section of voice data 610 according to an example embodiment. The user terminal may transmit the multimedia content generated based on the voice data, the emotional state of the user identified based on the voice data, and the selected character to another user terminal. For example, the multimedia content may be generated by combining the voice of the user and the animated graphic object of the character associated with the emotional state of the user. In this case, the animated graphic object may include a plurality of preset images or videos.

In an example embodiment, the voice data 610 including the recording of the voice of the user may include sections ($T_1$, $T_3$) having a signal strength less than a predetermined threshold, and a section ($T_2$) having a signal strength equal to or greater than the predetermined threshold. That is, the voice data 610 may be divided into a section including the voice of the user equal to or greater than a certain volume and a section not including the voice of the user. For example, the voice data 610 may be analyzed to identify the sections $T_1$, $T_2$ and $T_3$. In this case, the predetermined threshold is a standard value for determining whether or not the voice of the user is included, and may be applied equally to all users using the emotion-based multimedia content generation service or may be applied differently for each user.

For example, the sections ($T_1$, $T_3$) having the signal strength less than the predetermined threshold may correspond a section between when the user presses the record button and when the user starts speaking, a section between when the user stops speaking and when the user presses the recording completion button, a section in which the user does not speak during recording, and the like. In addition, for example, the section ($T_2$) having the signal strength equal to or greater than the predetermined threshold may be a section including the voice of the user.

In an example embodiment, in the sections ($T_1$, $T_3$) having the signal strength less than the predetermined threshold, the animated graphic object included in the multimedia content may be maintained in a stationary state. For example, in the sections ($T_1$, $T_3$) having the signal strength less than the predetermined threshold, one preset image 620_1 included in the animated graphic object may be continuously displayed. That is, when it is determined that the voice of the user is not included in the sections ($T_1$, $T_3$) of the voice data 610, one preset image 620_1 included in the animated graphic object may be continuously displayed during the sections ($T_1$, $T_3$) of the multimedia content.

In an example embodiment, in the section ($T_2$) having the signal strength equal to or greater than the predetermined threshold, an animated graphic object included in the multimedia content may be replayed. For example, in the section ($T_2$), a plurality of preset images 620_1, 620_2, 620_3, 620_4, and 620_5 included in the object may be repeatedly displayed every predetermined time intervals. That is, by determining that the voice of the user is included in the section ($T_2$) of the voice data 610, the animated graphic object may be replayed during the section ($T_2$) of the multimedia content.

FIG. 6 illustrates that the voice data 610 includes one section ($T_2$) having the signal strength equal to or greater than the predetermined threshold, and two sections ($T_1$, $T_3$) having the signal strength less than the predetermined threshold, but example embodiments are not limited thereto. For example, the voice data may include a section having a signal strength equal to or greater than any number of predetermined thresholds and a section having a signal strength less than any number of predetermined thresholds. With this configuration, the emotion-based multimedia content can be generated such that the character appears to move according to the user's actual voice, thereby intuitively expressing the emotional state of the user to other users.

Figure 7:
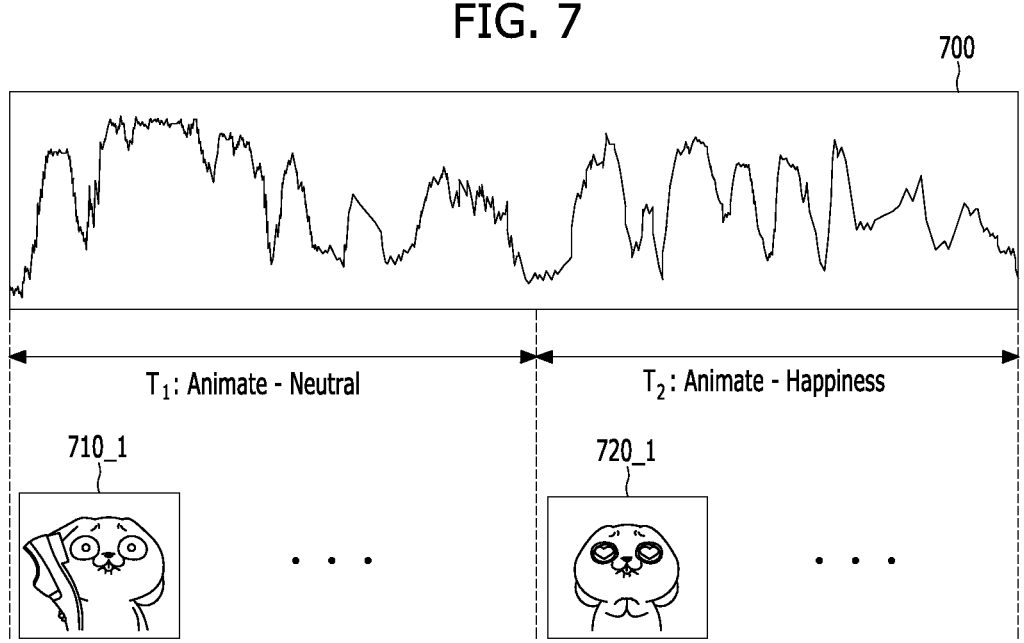
FIG. 7 is a diagram illustrating an action of an animated graphic object according to a section of voice data including two emotional states according to an example embodiment.

FIG. 7 is an exemplary diagram illustrating actions of animated graphic objects 710_1 and 720_1 according to the sections of voice data 700 that includes two emotional states according to an example embodiment. The user terminal 210 may transmit a multimedia content generated based on the voice data 700, the emotional state of the user identified based on the voice data, and the selected character to another user terminal 210. In this case, the user terminal 210 may transmit the voice data 700 that includes the recording of the voice of the user and selection information on the character to the information processing system 230 for generating and providing the multimedia content, in order to generate the multimedia content.

The information processing system 230 may identify the emotional state of the user based on the received voice data 700. In an example embodiment, the information processing system 230 may analyze the audio frequency characteristic of the voice data 700 to identify the emotional state of the user, thereby identifying the emotional state regardless of language and content. Additionally or alternatively, the information processing system 230 may detect a character string from the voice data 700 through voice recognition, and identify the emotional state of the user based on the detected character string. That is, the information processing system 230 may convert the voice included in the voice data 700 into text by using voice recognition technology (e.g., Speech-To-Text (STT) technology, and the like). Then the information processing system 230 may detect a word and/or character string, and the like expressing the user's emotion from the converted text, and identify the emotional state of the user based on the detected word and/or character string.

In an example embodiment, two or more emotional states may be identified for each of the time sections of one voice data 700. In the illustrated example, the voice data 700 may include two different emotional states of the user, and may include a time section associated with each emotional state. For example, the voice data 700 may include a time section ($T_1$) associated with an emotional state of neutral and a time section ($T_2$) associated with an emotional state of happiness.

The information processing system 230 may combine the animated graphic object of the character selected by the user and the voice data 700 to generate the multimedia content. In an example embodiment, when the voice data 700 includes the sections ($T_1$, $T_2$) associated with two emotional states, the information processing system 230 may generate a multimedia content such that an animated graphic object associated with the emotional state detected in each section is replayed. For example, the information processing system 230 may generate the multimedia content such that an animated graphic object 710_1 expressing the neutral emotional state is replayed during the time section ($T_1$) associated with the neutral emotional state of the voice data 700, and an animated graphic object 720_1 expressing the emotional state of happiness is replayed during the time section ($T_2$) associated with the emotional state of happiness. In this case, the multimedia content may replay the animated graphic object 710_1 and the voice data 700 together during the time section ($T_1$), and replay the animated graphic object 720_1 and the voice data 700 together during the time section ($T_2$).

FIG. 7 illustrates that the voice data 700 includes the sections associated with two emotional states, but example embodiments are not limited thereto, and the voice data 700 may include sections associated with three or more emotional states. In addition, while FIG. 7 illustrates that there is one section associated with one emotional state, example embodiments are not limited thereto, and there may be two or more sections associated with one emotional state, which are spaced apart from each other. With this configuration, even when one voice data 700 includes voices of multiple emotional states, the user terminal 210 may generate a multimedia content that effectively reflects his or her emotional states, and transmit the generated multimedia content to another user.

Figure 8:
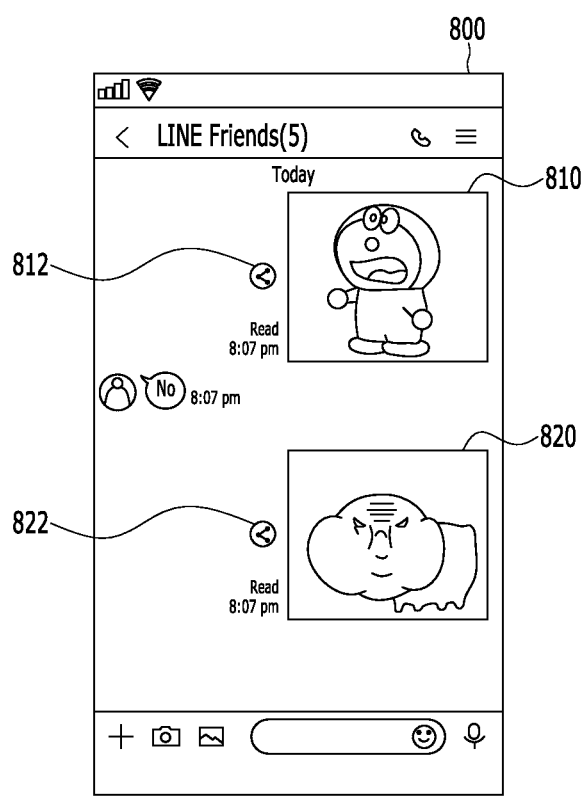
FIG. 8 is a diagram illustrating a chat room interface on an instant messaging application through which a multimedia content is transmitted according to an example embodiment.

FIG. 8 is an exemplary diagram illustrating a chat room interface 800 on an instant messaging application through which multimedia contents 810 and 820 are transmitted according to an example embodiment. As illustrated, the user terminal 210 may transmit the multimedia contents 810 and 820 generated based on the voice data that includes the recording of the voice of the user, the emotional state identified based on the voice data, and the selected character to another user. For example, the generated multimedia contents 810 and 820 may be transmitted to another user through the chat room on the instant messaging application.

In an example embodiment, the user and the other users included in the chat room may select and replay the multimedia contents 810 and 820 transmitted through the chat room with a touch input or the like. For example, when another user included in the chat room selects the multimedia content 810 or the multimedia content 820, the voice recorded by the user who transmitted the multimedia contents 810 and 820 may be output, while a character expressing the emotional state of the user is moving on the display. The multimedia contents 810 and 820 may be generated using different characters from each other, and used to visually represent different emotional states of the user.

In an example embodiment, the user may select share buttons 812 and 822 with a touch input or the like to share the multimedia contents 810 and 820 that are transmitted to another user through the chat room to another chat room or to yet another user on the instant messaging application, or to share with another application such as text applications or the like. The other user who receives the multimedia contents 810 and 820 from the user may also share the multimedia contents 810 and 820 with yet another user by using a similar share button.

In FIG. 8, it is described above that the corresponding multimedia contents 810 and 820 are replayed when the users included in the chat room select the multimedia contents 810 and 820 with a touch input or the like, but example embodiments are not limited thereto. For example, when a user of the chat room enters the corresponding chat room, the multimedia contents 810 and 820 may be automatically replayed. In another example, when the user of the chat room moves to the location of the multimedia contents 810 and 820 transmitted in the past by a scroll input or the like, the multimedia contents 810 and 820 may be automatically replayed.

FIG. 9 is a flowchart illustrating a method 900 for transmitting a multimedia content according to an example embodiment. The method 900 for transmitting a multimedia content may be performed by the user terminal 210 (e.g., at least one processor of the user terminal 210). The method 900 for transmitting a multimedia content may be started when the processor receives the voice data that includes the recording of the voice of the user, at S910. For example, the processor may receive the voice data through the instant messaging application installed in the user terminal.

In addition, the processor may display a plurality of characters on the display. Thereafter, the processor may receive a selection of one character from among the plurality of characters from the user, at S920. In this case, the character may be associated with a plurality of animated graphic objects expressing different emotional states from each other. In an example embodiment, each of the plurality of characters may have an animated graphic object expressing the emotional state of the user identified based on the voice data. For example, the plurality of characters may be arranged and displayed based on a usage history of the user in the past. Additionally or alternatively, the plurality of characters may be the recommendations for the characters that are frequently used by the other users in relation to the emotional state of the user.

The processor may transmit the multimedia content generated based on the voice data, the emotional state of the user identified based on the voice data, and the selected character to another user, at S930. For example, the multimedia content may be transmitted to another user through the chat room on the instant messaging application. In this case, the multimedia content may include the voice data and the animated graphic object expressing the emotional state of the user. In this case, the action of the selected character included in the multimedia content may be determined based on the emotional state of the user.

FIG. 10 is a flowchart illustrating a method 1000 for generating a multimedia content according to an example embodiment. The method 1000 for generating a multimedia content may be performed by the information processing system 230 (e.g., at least one processor of the information processing system 230). The method 1000 for generating a multimedia content may be started by the processor receiving the voice data that includes a recording of a voice of a first user from a first user terminal, at S1010. In this case, the processor may identify the emotional state of the first user from the received voice data, at S1020. For example, the processor may identify the emotional state of the first user by analyzing the audio frequency characteristic of the voice data, thereby sensing the emotional state regardless of language and content. Additionally or alternatively, the processor may detect a character string from the voice data through voice recognition, and identify the emotional state of the first user based on the detected character string.

In addition, the processor may receive a selection of one character from among the plurality of characters from the first user terminal, at S1030. For example, the character may be associated with a plurality of animated graphic objects expressing different emotional states from each other. Then the processor may generate a multimedia content based on the voice data, the emotional state of the first user, and the selected character, at S1040. In this case, the multimedia content may include the voice data and the animated graphic object expressing the emotional state of the first user. For example, the processor may determine the action of the selected character included in the multimedia content based on the emotional state of the user. Then the processor may transmit the multimedia content to the second user terminal associated with the second user included in the same chat room as the first user, at 51050.

The method described above may be provided as a computer program stored in a computer-readable recording medium for execution on a computer. The medium may continuously store a program executable by a computer or temporarily store a program for execution or download. In addition, the medium may be a variety of recording devices or storage devices in a form in which a single piece of hardware or several pieces of hardware are combined, but is not limited to a medium directly connected to any computer system, and may be present on a network in a distributed manner. An example of the medium includes a medium that is configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of this disclosure may be variously implemented. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

Although example embodiments described above have been described as utilizing aspects of the currently disclosed subject matter in one or more standalone computer systems, example embodiments are not limited thereto, and may be implemented in conjunction with any computing environment, such as a network or distributed computing environment. Furthermore, aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some example embodiments, various modifications and changes can be made without departing from the scope of the present disclosure, which can be understood by those skilled in the art to which the present disclosure pertains. Further, such modifications and changes are intended to fall within the scope of the claims appended herein.

What is claimed is:

1. A method for generating multimedia content, the method comprising:
   receiving, by a first user terminal, voice data that comprises a recording of a voice of a user, wherein the voice data comprises first data corresponding to a first time section in which a signal strength is less than a predetermined threshold and second data corresponding to a second time section in which the signal strength is equal to or greater than the predetermined threshold;
   identifying an emotional state of the user based on an audio frequency characteristic of the voice data;
   receiving, by the first user terminal, a selection of one character from among a plurality of characters from the user;
   generating a multimedia content comprising the voice data and an animated graphic object of the selected one character expressing the emotional state of the user, such that the animated graphic object is maintained in a stationary state during the first time section, and is replayed during the second time section; and transmitting the multimedia content to a second user terminal of another user.

2. The method according to claim 1, wherein the transmitting comprises transmitting the multimedia content to the second user terminal through a chat room on an instant messaging application.

3. The method according to claim 1, wherein the selected one character is associated with a plurality of animated graphic objects, each of which expresses a different emotional state, and the multimedia content comprises the voice data and the plurality of animated graphic objects.

4. The method according to claim 1, further comprising identifying an action of the selected one character based on the emotional state of the user.

5. A method for generating multimedia content, the method comprising:

receiving, by a first user terminal, voice data that comprises a recording of a voice of a user, wherein the voice data comprises first data corresponding to a first time section associated with a first emotional state of the user and second data corresponding to a second time section associated with a second emotional state of the user;

identifying the first emotional state and the second emotional state based on an audio frequency characteristic of the voice data;

receiving, by the first user terminal, a selection of one character from among a plurality of characters from the user, wherein the selected one character is associated with a first animated graphic object expressing the first emotional state and a second animated graphic object expressing the second emotional state;

generating multimedia content comprising the voice data, the first animated graphic object, and the second animated graphic object, such that the multimedia content replays the first animated graphic object and the first data together during the first time section, and replays the second animated graphic object and the second data together during the second time section; and transmitting the multimedia content to a second user terminal of another user.

6. The method according to claim 1, further comprising:
performing a voice recognition process based on the voice data to obtain a character string; and
identifying the emotional state of the user based on the character string.

7. The method according to claim 1, further comprising displaying the plurality of characters on a display, wherein the plurality of characters comprise the animated graphic object expressing the emotional state of the user.

8. The method according to claim 7, wherein the plurality of characters are arranged and displayed based on a usage history.

9. The method according to claim 7, wherein the plurality of characters are recommendations for characters frequently used by other users in relation to the emotional state of the user.

10. An information processing system comprising:
a communication interface;
at least one memory; and
at least one processor connected to the at least one memory and configured to execute at least one program stored in the at least one memory, wherein the at least one program comprises instructions for controlling the information processing system to:

receive voice data that comprises a recording of a voice of a first user from a first user terminal, wherein the voice data comprises first data corresponding to a first time section in which a signal strength is less than a predetermined threshold and second data corresponding to a second time section in which the signal strength is equal to or greater than the predetermined threshold;

identify an emotional state of the first user based on an audio frequency characteristic of the voice data;

receive, from the first user terminal, a selection of one character from among a plurality of characters;

generate a multimedia content comprising the voice data and an animated graphic object of the selected one character expressing the emotional state of the first user, such that the animated graphic object is maintained in a stationary state during the first time section, and is replayed during the second time section; and transmit the multimedia content to a second user terminal associated with a second user.

11. The information processing system according to claim 10, wherein the second user is included in a chat room on a same instant messaging application as the first user.

12. The information processing system according to claim 10, wherein the selected one character is associated with a plurality of animated graphic objects, each of which expresses a different emotional state, and the animated graphic object of the multimedia content is associated with the voice data and the emotional state of the first user.

13. The information processing system according to claim 10, wherein the at least one program further includes instructions for controlling the information processing system to identify an action of the selected one character included in the multimedia content based on the emotional state of the first user.

14. An information processing system comprising:
a communication interface;
at least one memory; and
at least one processor connected to the at least one memory and configured to execute at least one program stored in the at least one memory, wherein the at least one program comprises instructions for controlling the information processing system to:

receive voice data that comprises a recording of a voice of a first user from a first user terminal, wherein the voice data comprises first data corresponding to a first time section associated with a first emotional state of the first user and second data corresponding to a second time section associated with a second emotional state of the first user;

identify an emotional state of the first user based on an audio frequency characteristic of the voice data;

receive, from the first user terminal, a selection of one character from among a plurality of characters, wherein the selected one character is associated with a first animated graphic object expressing the first emotional state and a second animated graphic object expressing the second emotional state;

generate a multimedia content comprising the voice data, the first animated graphic object, and the second animated graphic object, such that the multimedia content replays the first animated graphic object and the first data together during the first time section, and replays the second animated graphic object and the second data together during the second time section; and transmit the multimedia content to a second user terminal associated with a second user.

15. The information processing system according to claim 10, wherein the at least one program further includes instructions for controlling the information processing system to analyze the audio frequency characteristic of the voice data and identify the emotional state of the first user based on the audio frequency characteristic, without considering language and content.

16. The information processing system according to claim 10, wherein the at least one program further includes instructions for controlling the information processing system to:

perform a voice recognition process based on the voice data to obtain a character string; and identify the emotional state of the first user based on the character string.

* * * * *